United States Patent [19]

Streifinger

[11] Patent Number: 4,755,103
[45] Date of Patent: Jul. 5, 1988

[54] FLOW MACHINE WITH FEED ARRANGEMENT FOR LUBRICANTS

[75] Inventor: Helmut Streifinger, Munich, Fed. Rep. of Germany

[73] Assignee: MTU Motoren- und Turbinen-Union München GmbH, Fed. Rep. of Germany

[21] Appl. No.: 18,359

[22] Filed: Feb. 24, 1987

[30] Foreign Application Priority Data

Feb. 21, 1986 [DE] Fed. Rep. of Germany ....... 3605619

[51] Int. Cl.⁴ .............................................. F16J 15/00
[52] U.S. Cl. .................................. 415/111; 415/112; 415/175; 184/6.11; 384/465; 384/473
[58] Field of Search ............... 415/110, 111, 112, 175; 60/39.08; 55/337; 184/6.11, 6.24; 384/465, 468, 469, 473

[56] References Cited

U.S. PATENT DOCUMENTS

| | | | |
|---|---|---|---|
| 3,017,230 | 1/1962 | Meermans | 184/6.11 |
| 3,976,165 | 8/1976 | Pilarczyk | 415/110 |
| 4,511,016 | 4/1985 | Doell | 60/39.08 |
| 4,576,001 | 3/1986 | Smith . | |

FOREIGN PATENT DOCUMENTS 3137947 10/1983 Fed. Rep. of Germany .
1508212 4/1978 United Kingdom .

Primary Examiner—Larry I. Schwartz
Attorney, Agent, or Firm—Barnes & Thornburg

[57] ABSTRACT

A flow machine, especially a gas turbine equipped with means for separating an oil/air mixture and for returning centrifuged oil droplets to a circulation having oil consuming devices such as bearing places and with a vent line leading from the center toward the outside; the separating means includes a porous air-permeable element built into the hollow main shaft between two oil-impermeable walls whereby radially outer feed openings for the oil/air mixture are arranged in the upstream wall which correspond to openings in the main shaft while an air discharge opening is arranged in the downstream wall in its center which is in communication with the vent line.

18 Claims, 3 Drawing Sheets

FLOW MACHINE WITH FEED ARRANGEMENT FOR LUBRICANTS

The present invention relates to a flow machine, especially to a gas turbine, which includes means arranged in its main shaft or coordinated thereto for the separation of an oil/air mixture with return of centrifuged oil droplets into a circulatory system having oil consuming devices, such as bearing places, and with a vent line leading from the center toward the outside.

Quite generally, with flow machines, especially gas turbines, there exists the problem of the separation or removal of air from the used-up oil which, as a rule, contains air bubbles. Only an oil which is cleansed in such a manner and eventually cooled is suitable for the return into a circulation with oil consuming loads such as bearing places.

In propulsion units of aircrafts, several shafts are provided for the most part, of which a main shaft connects the compressor and the turbine with each other. In shaft propulsion units, one has already coordinated an oil-collecting chamber to the hollow shaft. The known solution may cause difficulties by centrifugal forces, on the one hand, as regards the used or exhaust air conduction and, on the other, as regards the oil return. Known solutions are therefore either poorly suited for large air quantities, or the separation efficiency is not satisfactory because, for example, oil droplets are torn along with the exhaust air at high exhaust flow velocities.

It is the object of the present invention to provide a flow machine in which means for the separation of an oil/air mixture are provided which operate with a very high separation output also in case of very large air quantities.

The underlying problems are solved according to the present invention with a flow machine of the aforementioned type in that the separating means include a porous air-permeable element, in that the element is installed in the hollow shaft between two oil-impermeable walls whereby these walls are disposed essentially perpendicularly to the axial direction of the shaft, in that radially outer feed openings for the oil/air mixture are arranged in the upstream wall which correspond with openings in the main shaft, and in that an air discharge opening is arranged in the downstream wall within its center which is in communication with the vent line.

The principal advantages of the present invention reside, inter alia, in that a relatively simple and effective separation is possible with the present invention in a hollow main shaft of the propulsion unit. High separating rates are thereby also attainable with large air quantities. The oil/air mixture can flow into the hollow shaft through a few relatively small bores. Oil is prevented from flowing out by centrifugal force and is thrown back into the bearing chamber and is fed back to the tank by way of the suction line.

A further advantage of the separating system according to the present invention resides in that it does not require any long and externally located vent lines together with their fastening elements. As a result thereof, the assembly and disassembly of the propulsion unit is more easy (modular type of construction).

A further advantage is the fact that a drive of its own or a derived drive for the centrifugal separator can be dispensed with and thus considerable savings in weight as well as savings in cost and economy in servicing expenditures can be achieved. Additional bearings and gears for the auxiliary drive as also an additional heating of the oil/air mixture can be dispensed with. The pressure losses are considerably smaller compared to a long and externally located vent line with oil/air mixture. Sealing problems during idling are avoided. The reliability of the system in operation is additionally increased.

The installation of a porous element between two disks in the hollow main shaft offers above all the advantage of the increased separating output also with large air quantities. The manner of the air conduction through the disks and through the element is made in such a manner that the oil/air mixture enters axially radially outwardly at the upstream disk, flows centripetally inwardly, and the air leaves in the axial direction centrally out of the downstream disk whereas the oil is thrown outwardly by centrifugal force. The air is then conducted according to the present invention from the separator toward the outside by exhaust flow (for example, to a point downstream of the nozzle) by way of a vent line protruding into the hollow main shaft, which is sealingly connected with the downstream disk. The vent line is sealed in an advantageous manner by means of a seal. The seal may be acted upon with blocking air from the propulsion unit. In a further advantageous construction according to the present invention the vent line may be constructed double-walled for cooling purposes, i.e., especially for the supply of cooling air in the by-pass flow, oppositely directed to the vent flow.

Modifications of the described and claimed embodiments are possible without leaving the scope of the invention. In particular, the present invention is not limited to aircraft gas propulsion units with a multi-shaft arrangement.

The arrangement, size, number and distribution of bores in the main shaft can be so selected by the designer that the requisite air quantity can be passed therethrough without impairing the mechanical rigidity of the shaft. The bores in the upstream disk can be so selected that a high separating efficiency of air, on the one hand, and as high an oil return as possible into the circulation takes place. The axial bores or recesses, preferred in the outer edge area of the upstream disk, should be selected with advantage no smaller than the bores in the main shaft in order to avoid pressure losses.

Other separating means other than a porous mass may also be used between the upstream disk and the downstream disk, for example, a disk provided with a single set of blades could be used which rotates by the admission with air and which supplies the air centrally to the exhaust air opening and into the vent line.

The layout of the vent line also is not limited to the described conduction through the hot part of the propulsion unit. If the air is conducted, not into the cold part but into the exhaust gas flow, then a cover plate may be provided for the protection against excessively high temperatures, especially with after-burning, and/or a protection against flame backflash into the vent pipe, for example, in the form of a screen or sieve, may be provided. Shutters, valves, pumps, coolers and others may be installed into the vent lines. The circulation of the oil is maintained preferably by an oil pump.

A simple vent line layout alongside in a propulsion unit of an aircraft is possible with the present invention.

The cooling possibility of the vent line which additionally exists in the present invention avoids potential fire sources. The servicing and operating friendliness of the system saves costs. The weight saving which is made possible by the omission of auxiliary drives produces additional fuel savings for the entire propulsion unit. Additionally, the cell of the propulsion unit together with a space-saving construction is made possible and as a result thereof additional weight savings and a cell, respectively, propulsion unit, fairing and/or suspension which under circumstances is considerably more favorable aerodynamically, is achieved. It is possible to get along with only a single separator for different types of loads and different forms of oil circulations.

These and other objects, features and advantages of the present invention will become more apparent from the following description when taken in connection with the accompanying drawing which shows, for purposes of illustration only, several embodiments in accordance with the present invention, and wherein.

Figure 1:
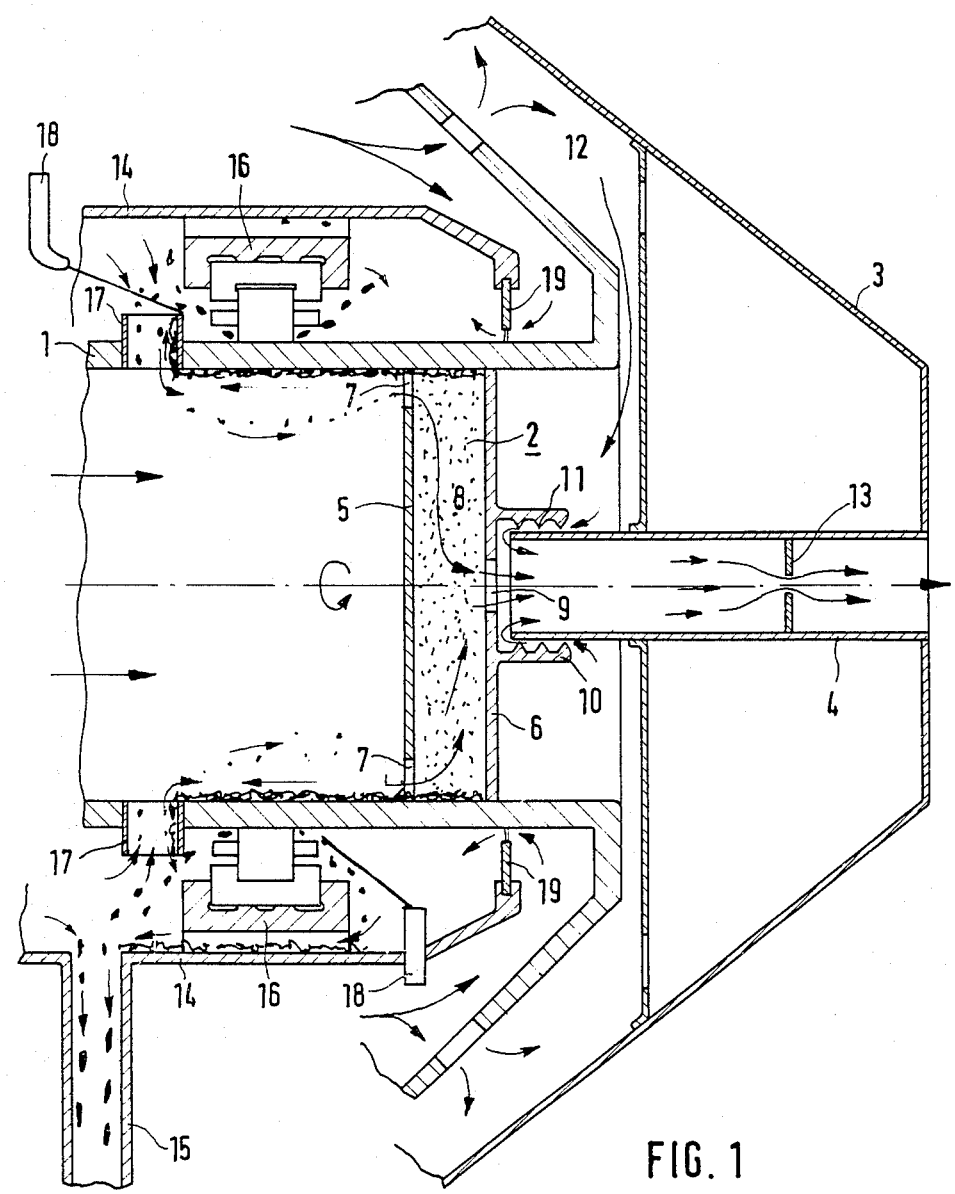
FIG. 1 is a schematic cross-sectional view through the end area of a propulsion unit in accordance with the present invention (hot or turbine part)

Referring now to the drawing wherein like reference numerals are used throughout the various views to designate like parts, and more particularly to FIG. 1, an oil separator 2 is fixedly installed in the main shaft 1 of the propulsion unit, i.e., it rotates together with the shaft, and the vent pipe 4 is arranged centrally in the fixed part 3 of the propulsion unit, in this case in a discharge cone circumcirculated by exhaust gases.

The separator includes two essentially parallelly arranged disks 5 and 6 whereby the disk 5 is arranged upstream in the air mixture and the disk 6 downstream. Axial bores 7 are provided in the disk 5 within the area of the outer circumference thereof, through which the oil/air mixture flows into the separator, in this case, a mass 8, and after the separation flows centrally into the vent pipe 4 through a bore 9. A seal 11, especially a labyrinth seal, is thereby arranged in a collar-like extension 10 of the wall 6 in order to seal off the vent pipe 4. Furthermore, additionally a blocking air stream 12 may be provided. A throttle element 13 such as a shutter, valve, flap or the like for the air quantity control and/or limitation is additionally built into the vent line 4. The shaft 1 is additionally surrounded by a bearing chamber 14 which adjoins an oil discharge line 15 to the oil circulating pump (see lower part of FIG. 1). One or several bearings 16 are arranged in the bearing chamber 14. These bearings 16 form the oil consuming devices in the oil circulation; thereafter the mixture of oil and blocking air is fed to the separator 2 by way of bores 17 which in size, number and distribution over the circumference of the hollow shaft are sufficient for the air quantity to be passed therethrough.

The air-permeable mass between the disks 5 and 6 is, for example, metal foam as is commercially available under the trademark "Retimet". However, other separating materials are usable, as mentioned above. The distance between the bores 17 and the bores 7 is to be selected small with advantage in order to keep small the heat transfer. Care must be taken that during the rotation of the shaft oil, when it enters into the packing, is centrifuged off and is again returned along the inner wall of the hollow shaft through the bores 17 into the circulation to the loads, i.e., in this case, to the bearings 16. It can be readily seen that the oil return output increases with the rotational speed. By reason of the pressure difference, the air flows through the central bore 9 into the vent pipe 4 to the atmosphere. The oil, which is fed fresh through oil nozzles 18 out of the circulation, for example, by way of oil coolers and oil pump, remains in the bearing chamber 14 as a result of the seal 19 represented here as brush seal. The oil droplets and their flow are indicated in the drawing by arrows, similarly, the air flow directions are indicated by arrows. In lieu of the illustrated seals, also other types of seals may be used. The type and the number of the porous packings, however, may be changed depending on the desired rate of air flow (quantity/time)—i.e. more porous with larger quantity. On the other hand, the oil also must not leave during standstill of the propulsion unit. The air quantity which leaves after the separation through the opening 9 in the disk 6 of the separator 2 and enters into the vent line, lies at more than 10 g/s. For example, a circumferential velocity within the area of the inner wall of the hollow shaft 1 between about 10 and 100 m/sec, preferably between 50 and 100 m/sec takes care for an effective oil separation. The pressure in the bearing chamber can be kept lower and also the heat transfer to the oil.

Figure 2:
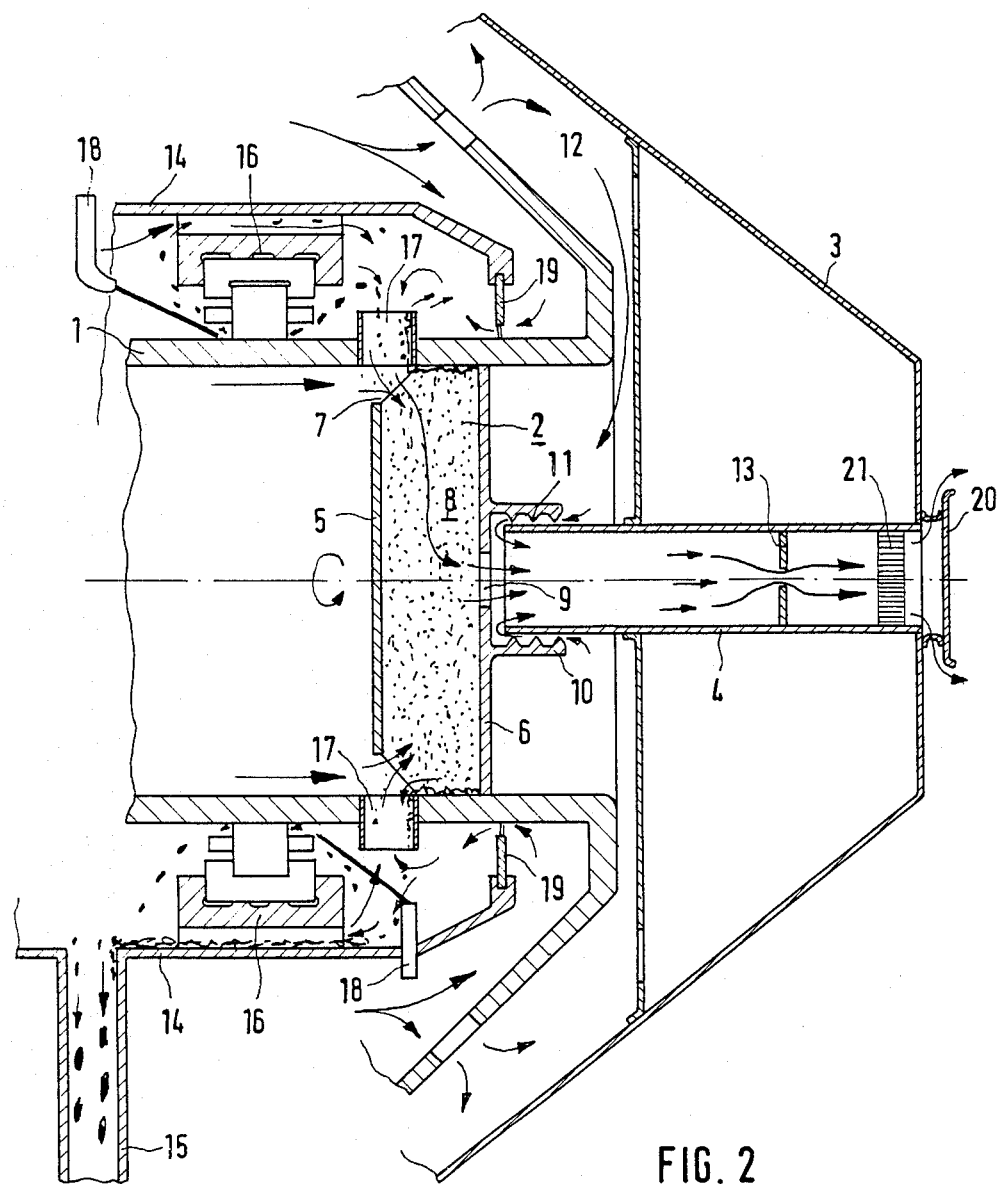
FIG. 2 is a schematic cross-sectional view through the same installation in a modified embodiment according to the present invention for an exhaust gas afterburning (thermal)

In FIG. 2, an embodiment similar to FIG. 1 can be seen whereby the same parts are designated with the same reference numerals. The bores 17 in the main shaft 1, however, have in this embodiment a spacing from the openings 7 approaching zero which permit the entry of the oil/air mixture into the porous packing 2. In addition to the embodiment according to FIG. 1, a thermal after-burning is provided in this propulsion unit which adjoining to the right in the drawing results from the exhaust gas stream and the special conduction thereof and/or treatment such as, for example, additional fuel injection. For this purpose, a cover plate 20 is provided serving the heat protection or heat damming, and a metallic sieve or screen 21 is provided for preventing possible backfirings or flashbacks.

Figure 3:
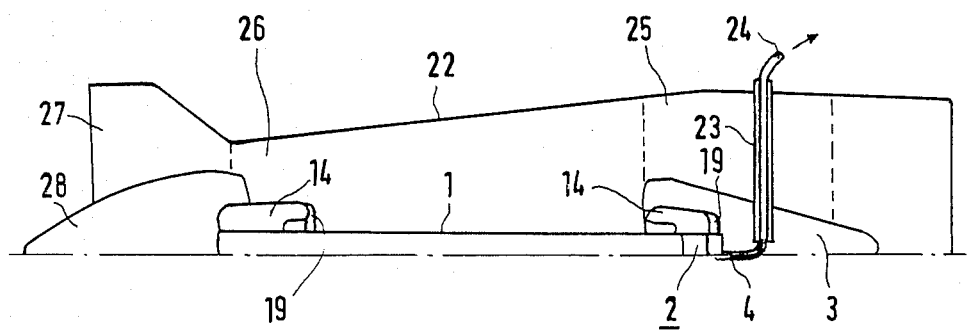
FIG. 3 is a schematic view indicating the contours of the flow machines and its main shaft with indicated vent line in accordance with the present invention.

The exhaust air is permitted to leave from the separator 2 by way of a vent line 4 protruding into the shaft 1 through the exhaust gas stream and the housing of the line 23 constructed double-walled for cooling purposes at an overboard point 24 (FIG. 3) or is conducted to the discharge cone in the exhaust gas stream up to a point downstream of the nozzle orifice of the propulsion unit. The cooling in the jacket line 23 of the vent line 4 is achieved by air in counterflow to the flow of the separated air indicated to the right in FIG. 3 in the upper part at 24. The hot propulsion unit area, in this case, high temperature or high pressure turbine area, is designated in FIG. 3 by reference numeral 25 and the compressor area by reference numeral 26. A by-pass propulsion unit with an air by-pass at 27 by way of an inlet cone 28 is illustrated in FIG. 3, it being understood that the present invention is not limited thereto. Propulsion unit parts not necessary for an understanding of the present invention are not shown in the drawing of the various embodiments for the sake of simplicity. They are of known type. It is important for the present invention that above all at high rates of air flow the oil separating degree has been considerably improved and this with an extraordinarily simple constructive arrangement with corresponding cost and weight advantages. The present invention combines the advantages of a customary separating packing with the arrangement undertaken herein in a hollow shaft which, for example, connects the compressor and the turbine of a gas propulsion unit (possibly individual stages thereof). Air quantities and air velocities can thereby be selected with advantage within wide limits so that the same are as small as possible at the discharge opening 9 in the disk 6. By contrast, the oil quantity which is returned to the load—in this case the bearing—can be considerably increased by the arrangement and construction of the bores in accordance with the present invention within the wall of the hollow main shaft 1. Oil losses are avoided even at standstill, idling or similar operating phases. Such air is preferably used as cooling or blocking air which was already tapped off anyhow from the compressor for these or similar purposes so that the advantages of the described arrangement far outweigh their disadvantages.

While I have shown and described only several embodiments in accordance with the present invention, it is understood that the same is not limited thereto. For example, also all combinations and subcombinations of the described, illustrated and claimed features belong to the present invention. The application of the present invention is not limited to gas propulsion units for aircrafts but can also be utilized with a stationary installation or any other vehicles. I therefore do not wish to be limited to the details shown and described herein, but intend to cover all such changes and modifications as are encompassed by the scope of the appended claims.

I claim:

1. A lubricant/gas separating arrangement for a flow machine having a rotatable hollow shaft, comprising:
   a separating chamber disposed inside said rotatable hollow shaft, said separating chamber being bounded by radially inwardly facing walls of said rotatable hollow shaft and by first and second disk shaped liquid impermeable walls spaced axially from one another in said rotatable hollow shaft,
   suspension inlet means opening into the separating chamber for supplying a suspension of liquid lubricant and gas,
   lubricant outlet means for accommodating outflow of liquid lubricant from said separating chamber,
   gas outlet means for accommodating outflow of gas from said separating chamber,
   and separation packing disposed in said separating chamber for accommodating separation of said lubricant and gas upon rotation of said rotatable hollow shaft with flow of liquid lubricant radially outward to said lubricant outlet means and flow of gas to said gas outlet means,
   wherein said suspension inlet means and lubricant outlet means are formed by common openings to the separating chamber.

2. An arrangement according to claim 1, comprising oil consuming means disposed for receiving liquid lubricant from said lubricant outlet means.

3. An arrangement according to claim 1, wherein the machine is a gas turbine.

4. An arrangement according to claim 2, wherein said oil consuming means are bearing means for the rotatable hollow shaft.

5. An arrangement according to claim 1, wherein the hollow rotatable shaft is the main shaft of a flow machine.

6. An arrangement according to claim 1, wherein said liquid impermeable walls are disposed essentially perpendicularly to the axial direction of the shaft.

7. An arrangement according to claim 1, wherein throttling means are provided in gas outlet means for throttling exhaust gas flow.

8. An arrangement according to claim 1, wherein the suspension inlet means includes bores in the walls of the hollow shaft and openings in the liquid impermeable walls, said openings being disposed at radially outer edges of one of said impermeable walls and being matched substantially in their respective size and cross-section to the dimension of the bores in the main shaft with which they correspond.

9. An arrangement according to claim 6, wherein said suspension inlet means includes bores disposed around the circumference of the hollow shaft and opening radially into the hollow shaft and openings in the first liquid impermeable wall, said bores in the hollow shaft being disposed axially adjacent the first liquid impermeable walls such that oil droplets centrifuged from the separation packing are returnable directly radially outwardly through the bores to the oil consuming means.

10. An arrangement according to claim 6, wherein said suspension inlet means includes bores disposed around the circumference of the hollow shaft and opening radially into the hollow shaft and openings the first liquid impermeable wall, said bores in the hollow shaft being disposed axially spaced from the first liquid impermeable wall such that the oil droplets centrifuged from the separation packing are returnable along an axial section of the inwardly facing walls of the hollow shaft before passing radially outwardly through the bores in the hollow shaft.

11. An arrangement according to claim 1, wherein the gas outlet means includes a vent line arranged in a high temperature of one of a turbine and propulsion unit and is constructed double-walled for cooling purposes.

12. An arrangement according to claim 4, wherein the suspension inlet means includes bores in the walls of the hollow shaft and openings in the liquid impermeable walls, said openings being disposed at radially outer edges of one of said impermeable walls and being matched substantially in their respective size and cross-section to the dimension of the bores in the main shaft with which they correspond.

13. An arrangement according to claim 4, wherein said suspension inlet means includes bores disposed around the circumference of the hollow shaft and opening radially into the hollow shaft and openings in the first liquid impermeable wall, said bores in the hollow shaft being disposed axially adjacent the first liquid impermeable walls such that oil droplets centrifuged from the separation packing are returnable directly radially outwardly through the bores to the oil consuming means.

14. An arrangement according to claim 12, wherein the gas outlet means includes a vent line arranged in a high temperature of one of a turbine and propulsion unit and is constructed double-walled for cooling purposes.

15. An arrangement according to claim 12, wherein throttling means are provided in the gas outlet means for throttling exhaust gas flow.

16. An arrangement according to claim 1, wherein the gas outlet means includes a vent line opening into a center part of said second impermeable wall.

17. An arrangement according to claim 9, wherein the gas outlet means includes a vent line opening into a center part of said impermeable wall.

18. An arrangement according to claim 10, wherein the gas outlet means includes a vent line opening into a center part of said impermeable wall.

* * * * *